(12) United States Patent
Yamagiwa et al.

(10) Patent No.: US 7,520,527 B2
(45) Date of Patent: Apr. 21, 2009

(54) VEHICLE REAR STRUCTURE PROVIDED WITH CURTAIN AIR BAG DEVICE

(75) Inventors: Tsuyoshi Yamagiwa, Fuchu-cho (JP);
Shouichirou Hidaka, Fuchu-cho (JP);
Hiroaki Nakao, Fuchu-cho (JP);
Motoharu Hirata, Fuchu-cho (JP);
Tsutomu Watanabe, Fuchu-cho (JP);
Hideharu Saiki, Fuchu-cho (JP);
Hideaki Kikkawa, Hiroshima (JP)

(73) Assignee: Mazda Motor Corporation (JP)

( * ) Notice: Subject to any disclaimer, the term of this patent is extended or adjusted under 35 U.S.C. 154(b) by 190 days.

(21) Appl. No.: 11/723,795

(22) Filed: Mar. 22, 2007

(65) Prior Publication Data

US 2007/0228700 A1    Oct. 4, 2007

(30) Foreign Application Priority Data

Mar. 29, 2006 (JP) .............................. 2006-090845
Mar. 29, 2006 (JP) .............................. 2006-090846

(51) Int. Cl.
*B60R 21/16* (2006.01)

(52) U.S. Cl. ............... 280/730.2; 280/728.2; 280/728.3

(58) Field of Classification Search .............. 280/728.1, 280/728.2, 728.3, 730.2
See application file for complete search history.

(56) References Cited

U.S. PATENT DOCUMENTS 6,142,509 A * 11/2000 White et al. ............. 280/730.2
6,485,048 B2 * 11/2002 Tajima et al. ............. 280/728.2
6,502,855 B1   1/2003 Greiner et al.
6,523,887 B1 * 2/2003 Picken et al. ................. 296/214

(Continued)

FOREIGN PATENT DOCUMENTS

JP    2004-189099    7/2004

(Continued)

OTHER PUBLICATIONS

European Search Report Application No. EP 07 00 4592 dated Jun. 11, 2007.

*Primary Examiner*—Toan C To
(74) *Attorney, Agent, or Firm*—Studebaker & Brackett PC; Donald R. Studebaker

(57) ABSTRACT

A vehicle rear structure with a curtain air bag device is provided which is capable of, when a predetermined condition is satisfied, effectively restraining a front upper end of a rear pillar trim from breaking and scattering, and spreading a curtain member properly. The air bag device includes a curtain member which is fixed to the body of a vehicle, inflates with a gas pressure supplied when the predetermined condition is satisfied, and spreads so as to cover the interior surface of a side window glass at least from a side end of a roof trim up to a predetermined lower position in the front surface of the rear pillar; a roof side trim is provided between the vicinity of the upper end of the side window glass and the roof trim, and a rear end of the roof side trim is disposed to overlap with the front upper end of the rear pillar trim; and the curtain member spreads from the inner in the vehicle width directions through the boundary part between the rear end of the roof side trim and the front upper end of the rear pillar trim toward a cabin space of the vehicle.

17 Claims, 9 Drawing Sheets

U.S. PATENT DOCUMENTS

| | | | |
|---|---|---|---|
| 6,530,594 B1 * | 3/2003 | Nakajima et al. | 280/730.2 |
| 6,565,116 B1 * | 5/2003 | Tajima et al. | 280/730.2 |
| 6,883,828 B2 * | 4/2005 | Ohki | 280/730.2 |
| 7,017,942 B2 * | 3/2006 | Elqadah et al. | 280/730.2 |
| 2003/0146607 A1 * | 8/2003 | Ohki | 280/730.2 |
| 2003/0209891 A1 * | 11/2003 | Kubota et al. | 280/730.2 |
| 2004/0150198 A1 | 8/2004 | Totsuka et al. | |
| 2004/0256843 A1 * | 12/2004 | Totani et al. | 280/730.2 |
| 2005/0052001 A1 | 3/2005 | Totani et al. | |
| 2006/0043703 A1 * | 3/2006 | Enriquez | 280/730.2 |

FOREIGN PATENT DOCUMENTS

| | | |
|---|---|---|
| JP | 2004-314655 | 11/2004 |
| JP | 2004/314655 | 11/2004 |

\* cited by examiner

VEHICLE REAR STRUCTURE PROVIDED WITH CURTAIN AIR BAG DEVICE

BACKGROUND OF THE INVENTION

1. Field of the Invention

This invention relates to a vehicle rear structure provided with a curtain air bag device which spreads out so as to cover sides of a vehicle cabin when the vehicle has a side bump, a rollover or the like, to protect passengers.

2. Description of the Background Art

Conventionally, as disclosed in Japanese Unexamined Patent Publication No. 2004-189099 and United State Unexamined Patent Publication No. 2004-150198, a curtain member or an air bag is fixedly attached along sides of pillars and a roof. Upon collision or the like, the curtain member is inflated with a gas pressure produced by an inflator to thereby spread out the curtain member to cover the sides of a cabin space of the vehicle, specifically, regions from the sides of a roof trim to predetermined lower positions in the front of a rear pillar, and protect an occupant from an impact given when the vehicle collides sideways, rolls over or other accident.

Furthermore, Japanese Unexamined Patent Publication No. 2004-314655 discloses provision of a roof side trim or a roof side inner garnish which is made of a harder material than a roof trim along an upper end of a side window glass or a quarter window glass or the like. A lower part of a roof side rail is covered with the roof side trim. A curtain member is provided along an overlapping zone of an inner side end of the roof side trim and a side end of the roof trim, and is spread out from a boundary between the inner side end of the roof side trim and the side end of the roof trim owing to the fact that a spreading pressure of the curtain member deforms downward them.

In the configuration, as disclosed the former two prior art documents, that the curtain member (air bag) is spread out so as to cover the sides of the cabin space of the vehicle from the outer end of the roof trim to a predetermined lower position in front of the rear pillar, a front lower end of the curtain member is hooked on a front pillar and a rear lower end of the curtain member is hooked on the rear pillar to thereby hold the spread state stably. This offers an advantage in that when the vehicle bumps sideways, rolls over or meets other accident, the curtain member contributes to effectively restraining an occupant or a part of the occupant's body from being moved outward.

However, if the rear pillar trim is not adequately deformed in the process of the curtain member spreading out toward the cabin space of the vehicle from the boundary between the rear end of the roof trim and the front upper end of the rear pillar trim, the rear pillar trim will hinder the curtain member from spreading out. Besides, in cold areas, the rear pillar trim made of a synthetic resin, such as polypropylene has a tendency of reducing the strength as the surrounding temperature decreases, and causes the problem that the spreading curtain member breaks off the front upper end or other portion of the rear pillar trim.

In the configuration, as disclosed in the third prior art document, that the roof side trim is provided to cover the lower part of the roof side rail, it is necessary to deform the boundary between the roof side trim made of a harder material than the roof trim and the rear pillar trim, specifically, the part in which the rear end of the roof side trim and the front upper end of the rear pillar trim overlap each other in order to spread out the curtain member toward the cabin space of the vehicle. This raises the problem that the spreading pressure of the curtain member is likely to damage the rear end of the roof side trim and the front upper end of the rear pillar trim.

SUMMARY OF THE INVENTION

It is an object of the present invention to provide a vehicle rear structure which is free from the problems residing in the prior art.

It is another object of the present invention to provide a vehicle rear structure which can spread a curtain member properly without damaging a front upper end or other portion of a rear pillar trim.

According to an aspect of the present invention, a rear structure is adapted for a vehicle which includes a roof trim made of a flexible material and disposed on a lower surface of a ceiling part of the vehicle, a rear pillar trim made of a synthetic resin harder than the roof trim and disposed so as to cover a rear pillar located in the rear of the vehicle, and a side window glass disposed ahead of the rear pillar trim and whose upper end is located outer than the roof trim.

The rear structure is provided with an air bag device including a curtain member fixedly attached to a vehicle body and operable to inflate with a gas pressure supplied upon a predetermined condition to thereby spread over at least an inner surface of the side window glass from a side end of the roof trim and a front surface of the rear pillar.

A roof side trim is provided between a vicinity of an upper end of the side window glass and the roof trim, and a rear end of the roof side trim overlaps with a front upper end of the rear pillar trim with the rear end positioning inner than the front upper end so that the curtain member spreads from an inner end of the roof side trim and a boundary between the rear end of the roof side trim toward a cabin space of the vehicle.

These and other objects, features, aspects, and advantages of the present invention will become more apparent from the following detailed description of the preferred embodiments/examples with reference to the accompanying drawings.

DETAILED DESCRIPTION OF THE PREFERRED EMBODIMENTS OF THE INVENTION

Figure 1:
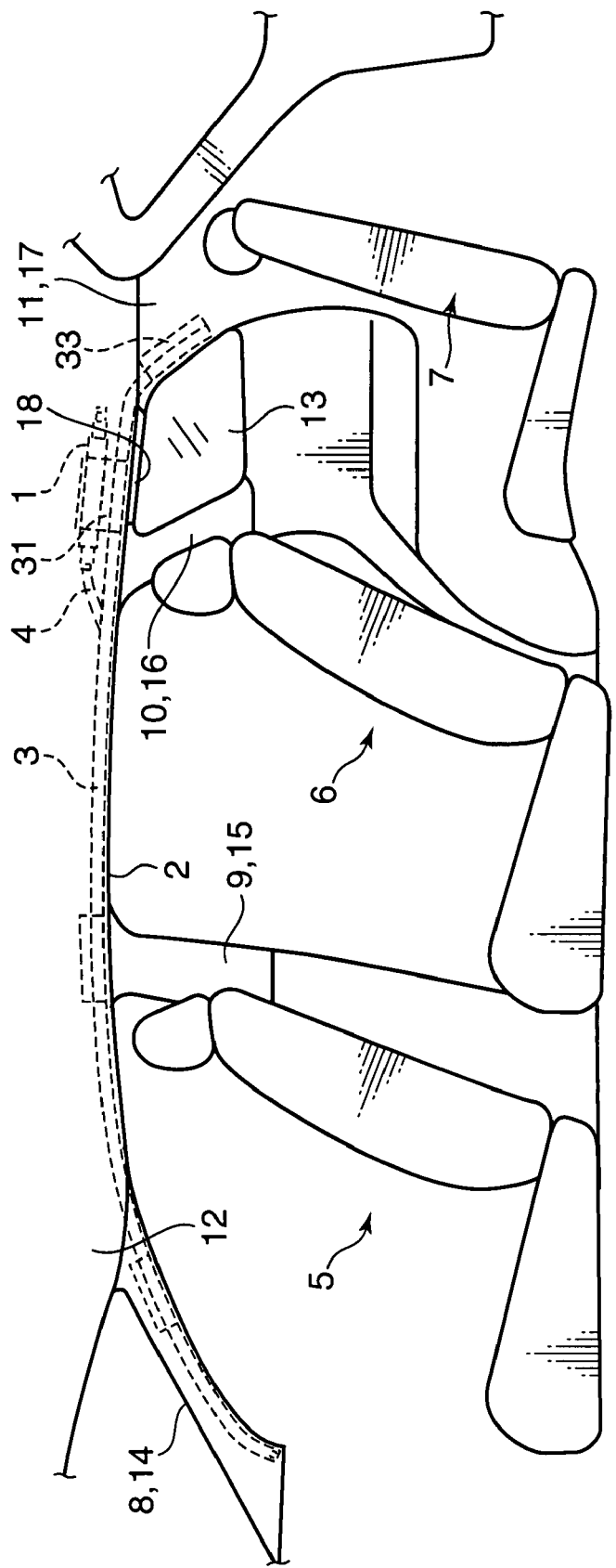
FIG. 1 is a schematic side view of a vehicle according to an embodiment of the invention.
Figure 2:
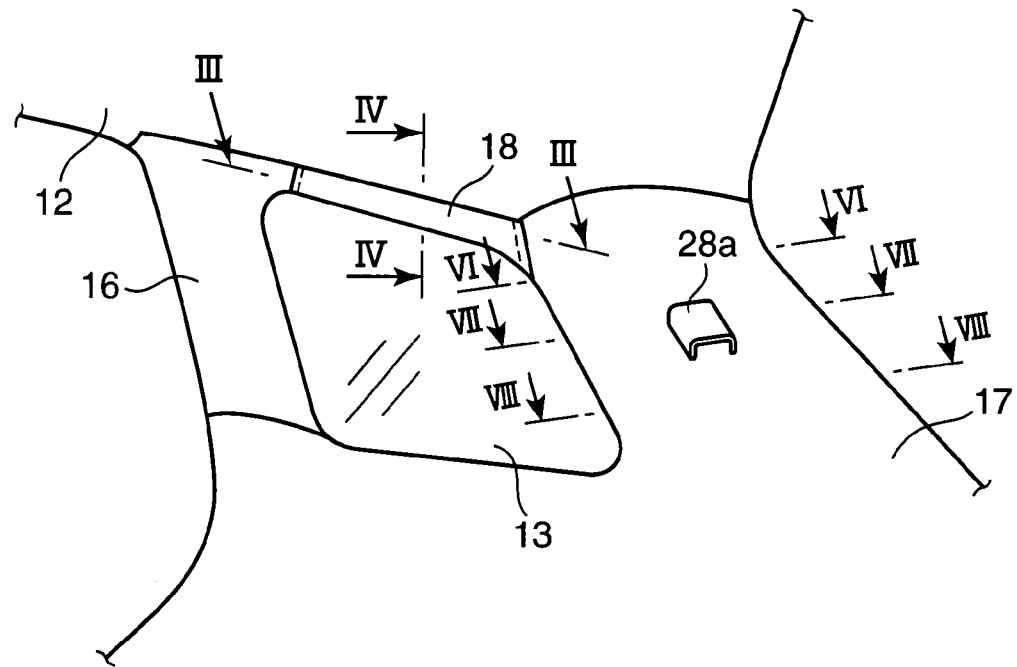
FIG. 2 is a perspective inside view of a side of a vehicle rear body.

FIGS. 1 to 10 show a vehicle rear structure provided with a curtain air bag device according to an embodiment of the present invention. The curtain air bag device includes: an inflator 1 which will do inflation upon a detection of a vehicle having a side bump, a rollover or the like accident, or a prediction of an accident in response to a detection signal of a sensor (not shown); a curtain member 3 which is accommodated in a folded state like a bellow along a roof side rail 2 or the like of the vehicle; and a gas supply pipe 4 for supplying the gas generated upon the operation of the inflator 1 to the curtain member 3 to spread the curtain member 3.

In the vehicle, three rows of seats for occupants are provided which include front row seats 5, middle row seats 6 and rear row seats 7. The vehicle has front pillars or A-pillars 8 on front sides, middle pillars or B-pillars 9 and C-pillars 10 at a predetermined interval behind the front pillars, and rear pillars or D-pillars 11 on rear sides. Also, the vehicle is provided with a roof trim 12 made of a flexible material, such as urethane foam, expanded polyethylene, on a lower surface of a ceiling thereof. Side window glasses or quarter window glasses 13 are provided ahead of the rear pillars 11. An upper end of the side window glass 13 is located outside the roof trim 12 in a vehicle width direction.

Furthermore, in the side of the vehicle body, an A-pillar trim 14, a B-pillar trim 15, a C-pillar trim 16 and a D-pillar trim 17, which are made of a synthetic resin harder than the roof trim 12, such as an ABS resin and polypropylene, are provided to cover the inner surface of each of the pillars 8 to 11. Besides, a roof side trim 18 is provided between the vicinity of the upper end of the side window glass 13 and the roof trim 12. The roof side trim 18 is made of a synthetic resin such as polypropylene harder than the roof trim 12. The roof side trim 18 covers the lower surface of the roof side rail 2 between the C-pillar trim 16 and the D-pillar trim 17. The inclusive angle between the roof side trim 18 and the front surface of the D-pillar trim 17 is set at 120 degrees or below in side view to make passengers at the rear row seats 7 feel comfortable, for example, to get a wide view.

Figure 3:
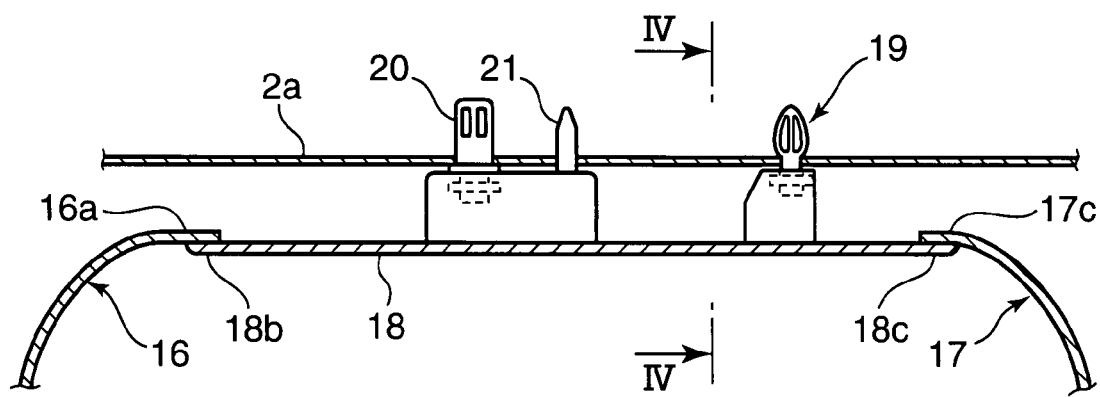
FIG. 3 is a sectional view taken along the III-III line in FIG. 2.

The roof side trim 18 is, as shown in FIG. 3, detachably mounted on an inner panel 2a of the roof side rail 2 by a rear clip member 19 made of a metal which serves to keep an vicinity of a rear end the roof side trim 18 at a fixed position, and by a front clip member 20 made of a synthetic resin which allows a front end of the roof side trim 18 to move a back and forth direction. The front clip member 20 is provided with a positioning pin 21 which serves as a positioning means when being attached. Further, the front clip member 20 is further provided with a retaining member (not shown) in the form of a string for allowing the roof side trim 18 to fall apart 1 to 10 cm from the original position, but preventing the roof side trim 18 from moving further when the roof side trim 18 is detached from the inner panel 2a as described later.

Figure 4:
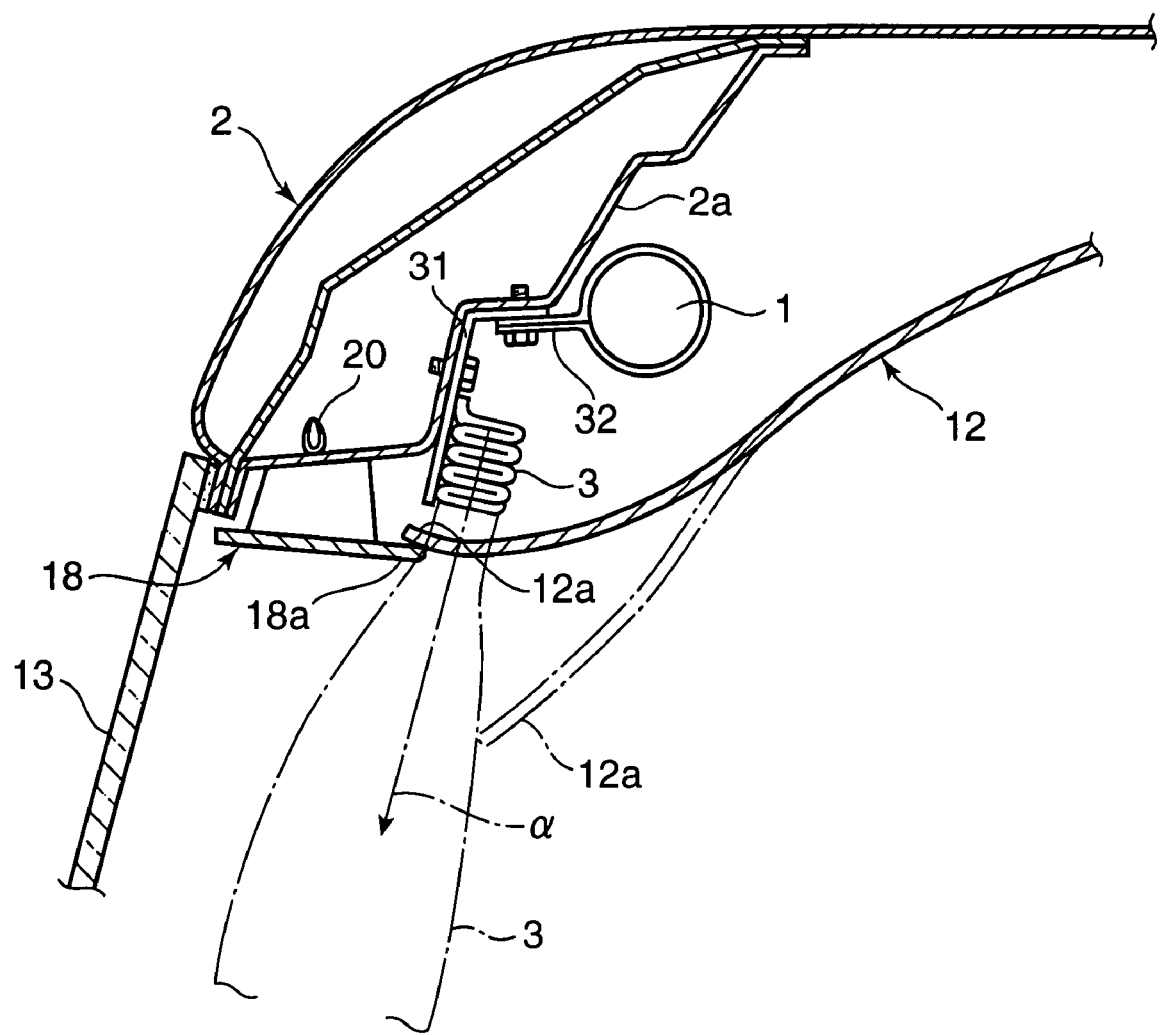
FIG. 4 is a sectional view taken along the IV-IV line in FIG. 2.

A front end 18b of the roof side trim 18 overlaps with a rear upper end 16b of the C-pillar trim 16. In the overlapping, the front end 18b is under the rear upper end 16b. A rear end 18c of the roof side trim 18 overlaps with a front upper end 17c of the D-pillar trim 17 with the rear end 18c being under the front upper end 17c. Also, as shown in FIG. 4, an inner side end 18a of the roof side trim 18 overlaps with a side end 12a (i.e., the outer end in the vehicle width directions) of the roof trim 12 with the side end 12a of the roof trim 12 being supported from below by the inner side end 18a.

Figure 5:
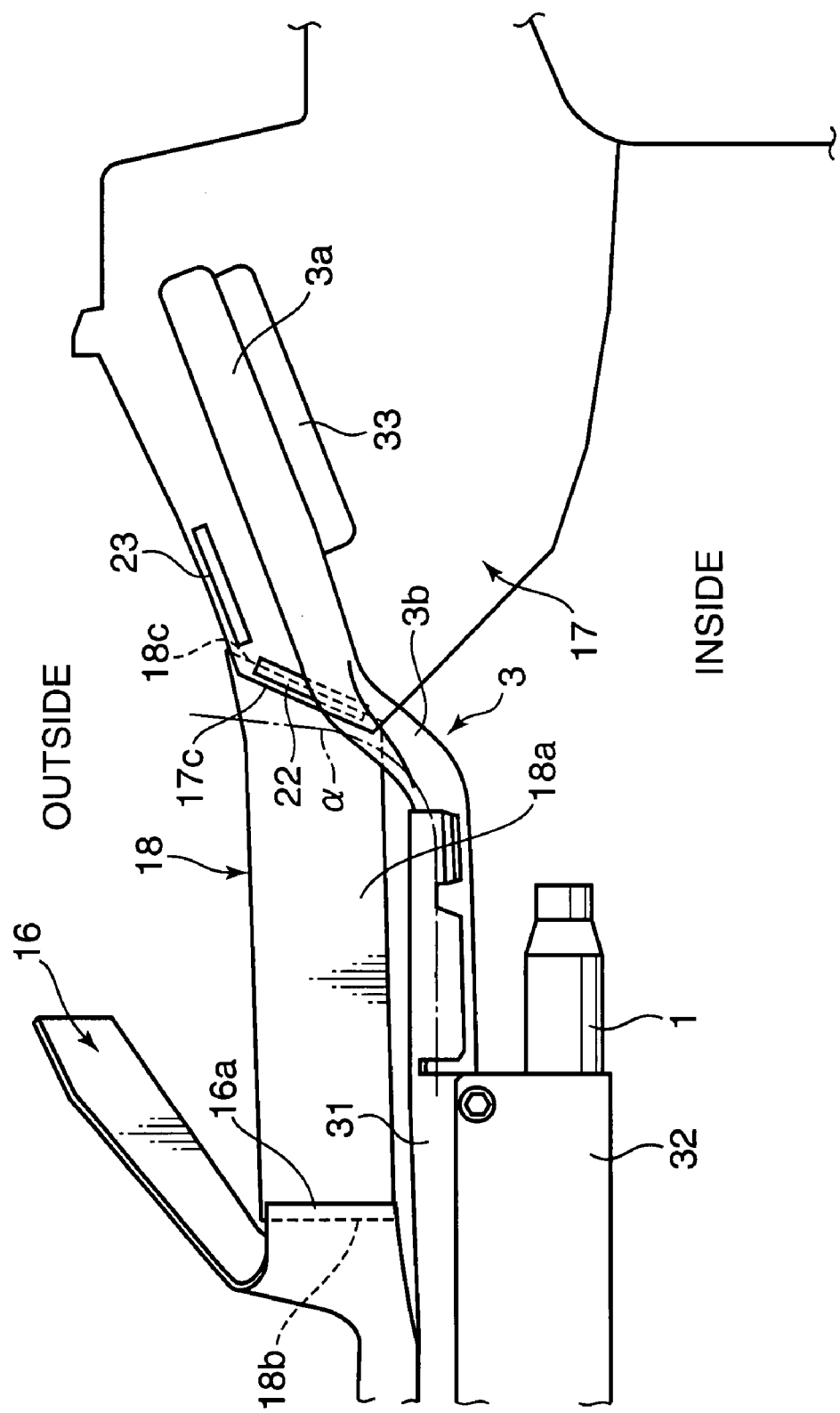
FIG. 5 is a top view of a side part of the vehicle rear body.

In addition, as shown in FIG. 5 showing a plan view of the side part of the vehicle rear body, the front upper end 17c of the D-pillar trim 17 and the rear end 18c of the roof side trim 18 are each inclined, in plan view, in such manner that their outer ends are at more rear position than their inner ends. The roof side trim 18 provides a better appearance. Besides, the roof side trim 18 is provided for the following reason: In the process of attaching a roof trim 12 to cover a substantial entire area of the upper wall of the vehicle cabin, the both sides of the large roof trim 12 are cut off an appropriate width to assure smooth carrying of the roof trim 12 into the vehicle cabin from a given opening of the vehicle body, and the root side trim 18 is thereafter attached to cover the gap caused by the cut-off. This technique is advantageous in facilitating the attachment of the roof trim 12.

The D-pillar trim 17 extends in the up and down direction along an inner surface of an inner panel 11a of the D-pillar 11. The front upper end 17c of the D-pillar trim 17 is near a rear end of the side window glass 13 (see FIG. 6). As shown in FIG. 5, adhesive tapes 22, 23 are glued onto the front upper end 17c of the D-pillar trim 17 adjacent to the rear end of the side window glass 13 and onto a part behind it, respectively. These adhesive tapes 22, 23 function as a scatter preventing means to prevent broken pieces from flying out in undesired directions when the spreading pressure of the curtain member 3 breaks out the front upper end 17c of the D-pillar trim 17.

Figure 6:
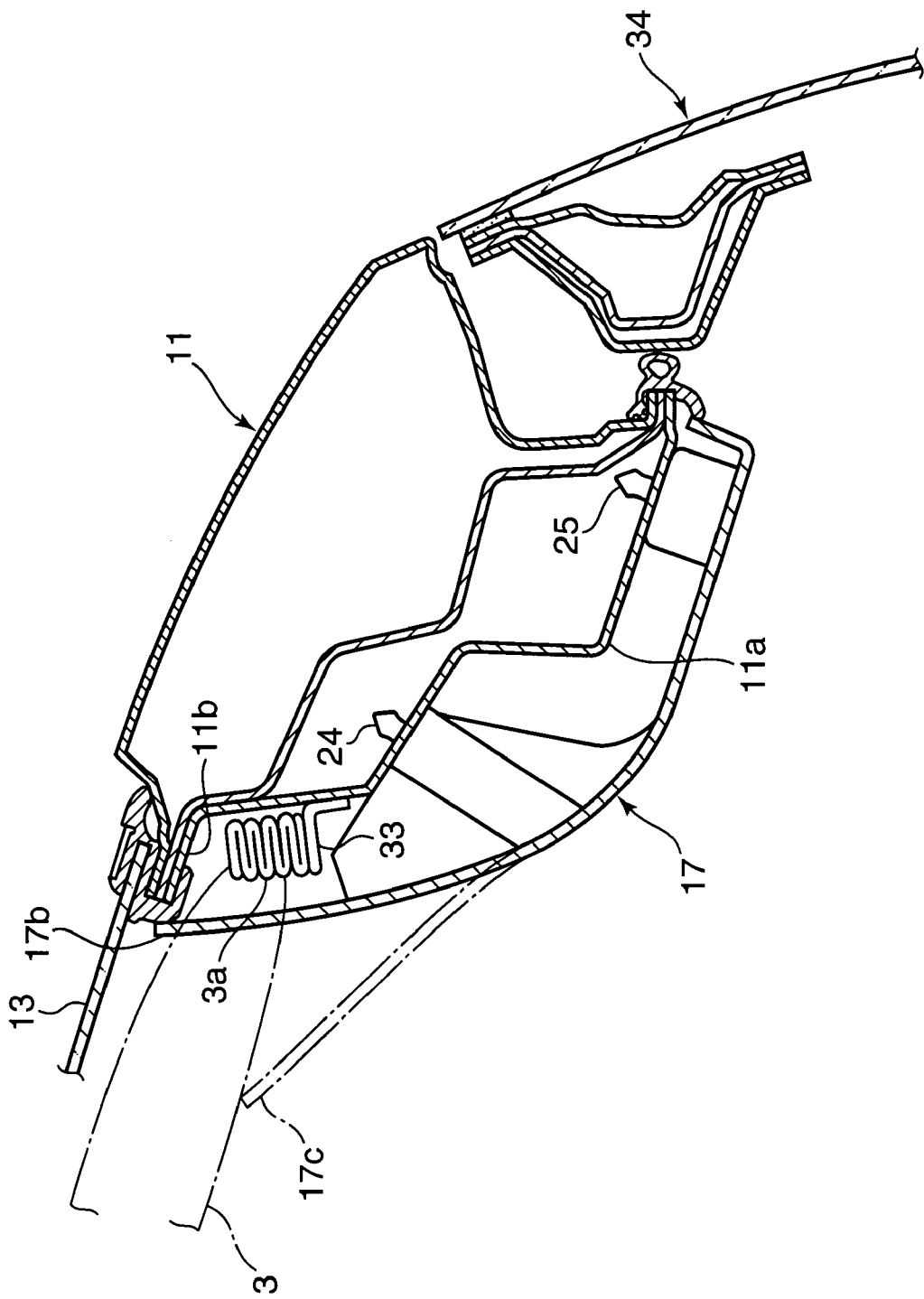
FIG. 6 is a sectional view taken along the VI-VI line in FIG. 2.

Above the D-pillar trim 17, as shown in FIG. 6, an upper clip member 24 is provided to attach a front section of the D-pillar trim 17 to the inner panel 11a of the D-pillar 11. The upper clip member 24 enables to detachably attach the front section of the D-pillar trim 17 on the inner panel 11a of the D-pillar 11, and to allow the D-pillar trim 17 to displace in accordance with a thermal expansion. Further, a positioning clip member 25 is provided to attach a rear section of the D-pillar trim 17 with kept positioned to the inner panel 11a of the D-pillar 11. More specifically, the inner panel 11a of the D-pillar 11 is formed with an attachment hole for permitting the upper clip member 24 to move. The D-pillar trim 17 is attached to the inner panel 11a of the D-pillar 11 by inserting the clip member 24 in the attachment hole. A displacement caused by a thermal expansion is allowed.

Figure 7:
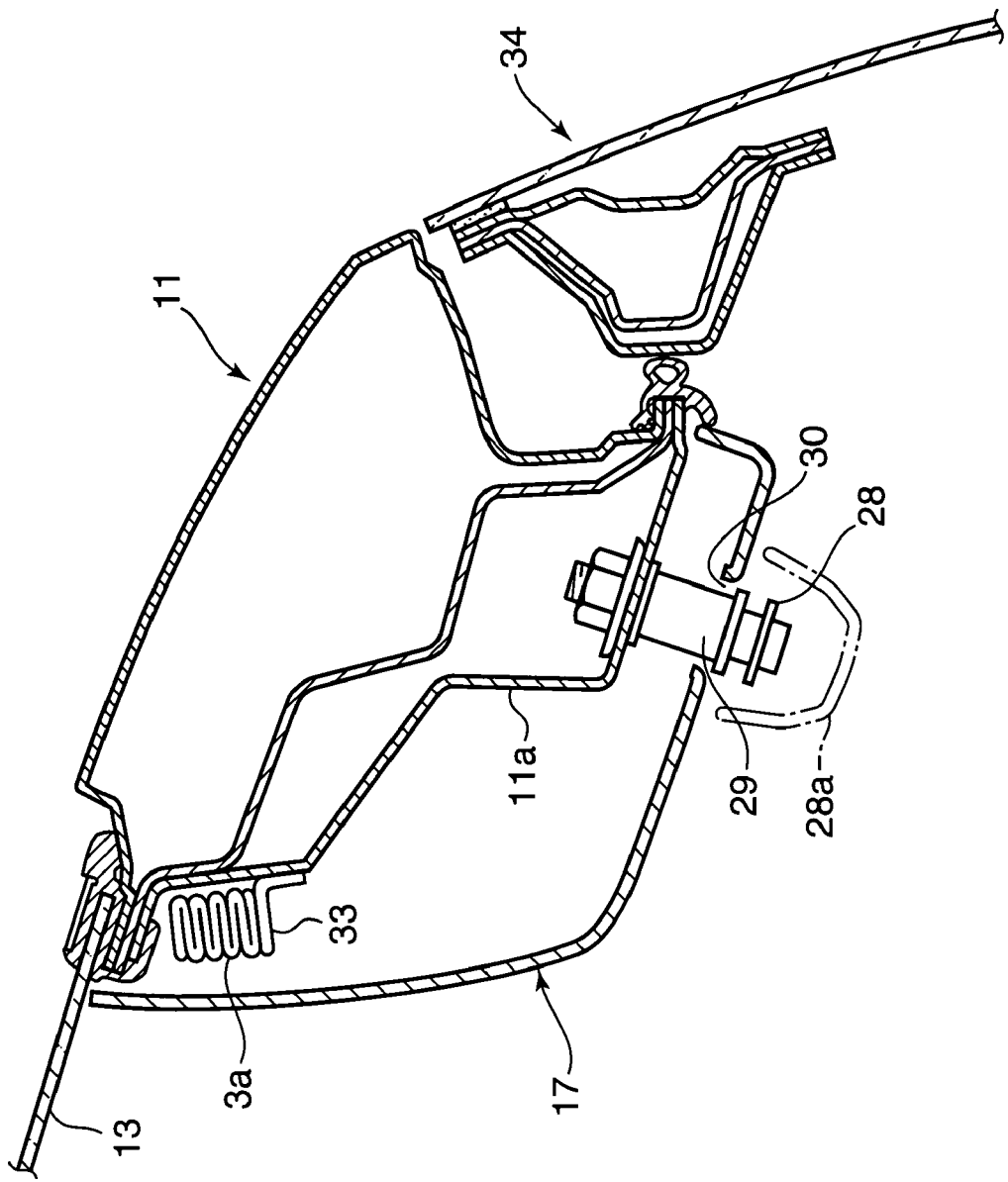
FIG. 7 is a sectional view taken along the VII-VII line in FIG. 2.
Figure 8:
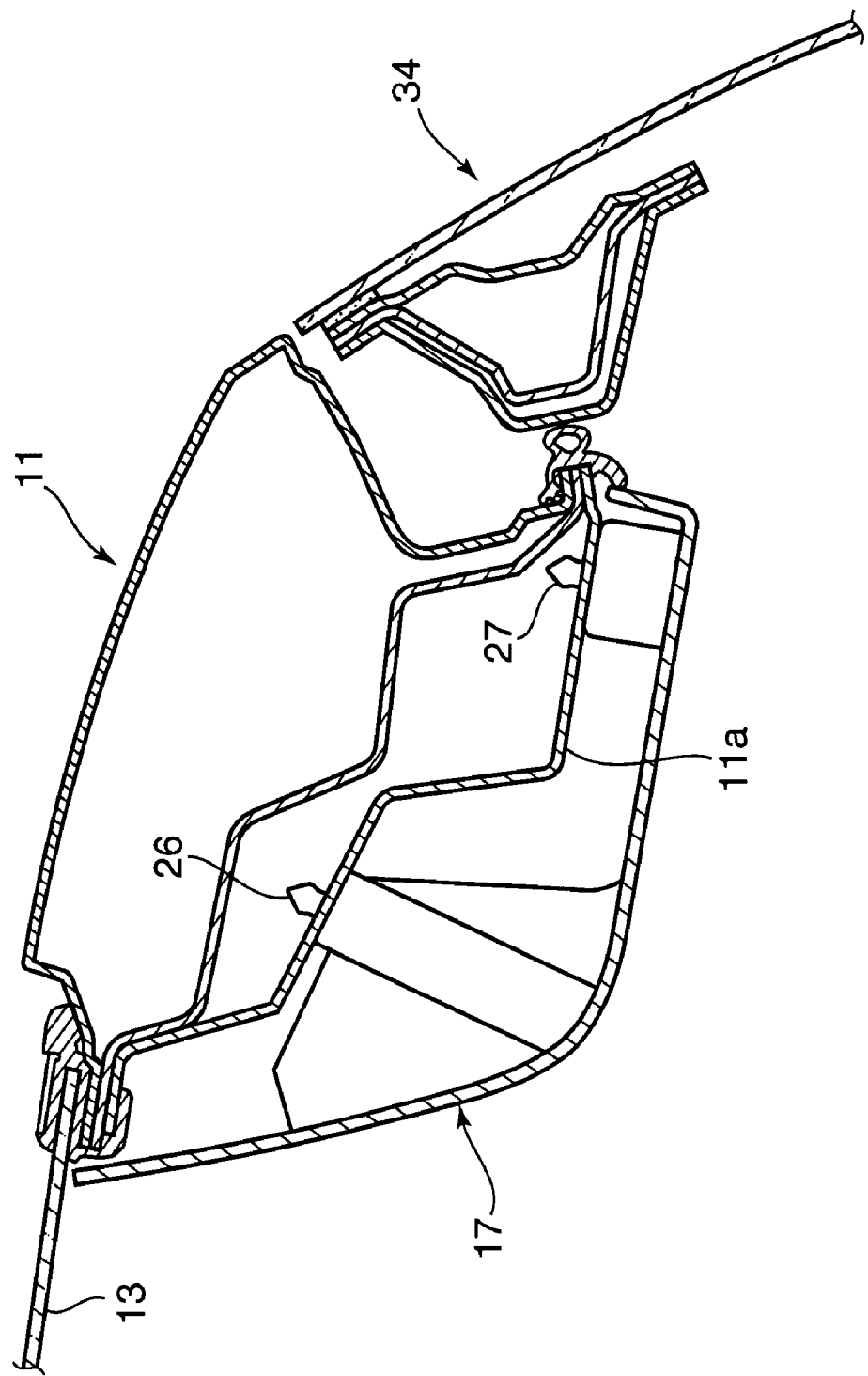
FIG. 8 is a sectional view taken along the VIII-VIII line in FIG. 2.

The D-pillar trim 17 is, as shown in FIG. 8, provided with lower clip members 26, 27 to attach the D-pillar trim 17 to the inner panel 11a of the D-pillar 11. These lower clip members 26, 27, especially the lower clip member 27 closer to a back door 34, are made of a material having a higher rigidity than the upper clip member 24, or have a fewer number of slits for elastic deformation, thus having a strong holding force. The lower section of the D-pillar trim 17 is attached and held stably while the upper front section is mounted on the vehicle body in the state that it can be easily detached. In a middle part of the D-pillar trim 17 in the up and down direction, as shown in FIG. 7, a through hole 30 for passing an attachment fitting 29 is formed. An anchor member 28 of a seat belt for retaining a person sitting on the rear row seat 7 is attached on the attachment fitting 29 which is fixedly attached to the inner panel 11a of the D-pillar 11. A cover 28a is provided to cover the part where the belt anchor 28 is placed.

The curtain member 3 is fixedly attached, as shown in FIG. 4, to a side member of the vehicle body including an inner panel 2a of a roof side rail 2 and the like via an attachment bracket 31. The curtain member 3 is accommodated in a space extending along an inner side of the roof side rail 2 from an upper part of the A-pillar 8 to the rear part of the vehicle body. Also, the curtain member 3 is disposed above a boundary between the roof trim 12 and the roof side trim 18, specifically, the part where the inner end 18a of the roof side trim 18 overlaps with the side end 12a of the roof trim 12. The curtain member 3 is designed to spread out from the overlapping zone to the vehicle cabin.

The curtain member 3 is disposed so as to spread downward near the boundary between the roof trim 12 and the roof side trim 18. When the vehicle has a side bump or the like, a gas pressure is introduced to the curtain member 3 from the inflator 1, and the curtain member 3 is, as shown by the virtual lines in FIG. 4, inflated to thereby press down the part where the inner end 18a of the roof side trim 18 overlaps with the side end 12a of the roof trim 12. The spreading pressure of the curtain member 3 displaces the side end 12a of the roof trim 12 downward, separately from the roof side trim 18. The side end 12a of the roof trim 12 functions as a guide, and the curtain member 3 spreads out to the vehicle cabin from the boundary between the roof trim 12 and the roof side trim 18. In FIG. 4, reference numeral 32 denotes an attachment fitting for the inflator 1. The attachment fittings 32 and the attachment bracket 31 for the curtain member 3 are united, and fixedly attached to the inner panel 2a of the roof side rail 2. In FIGS. 6 to 8, reference numeral 34 denotes a back door of the vehicle.

A terminal end of a rear section 3a of the curtain member 3 is fixedly attached, as shown in FIGS. 5 to 8, to the inner panel 11a of the D-pillar 11 via an attachment bracket 33. The rear section 3a of the curtain member 3 is accommodated in a space extending in an up and down direction along the front surface of the D-pillar 11. The part where the curtain member 3 is accommodated is covered with the D-pillar trim 17. The rear section 3a of the curtain member 3 is designed to spread out in a spreading direction α from a boundary between the rear end 18c of the roof side trim 18 and the front upper end 17c of the D-pillar trim 17 toward the cabin of the vehicle. The spreading direction α is along a plane passing an initial point of the folded curtain member 3 and a forward point of the folded curtain member 3 in the case of the curtain member 3 being folded like bellows, as this embodiment. In the case of the curtain member 3 being rolled up, on the other hand, the spreading direction α is along a plane passing a point near the attachment position and a center of the roll.

Figure 9:
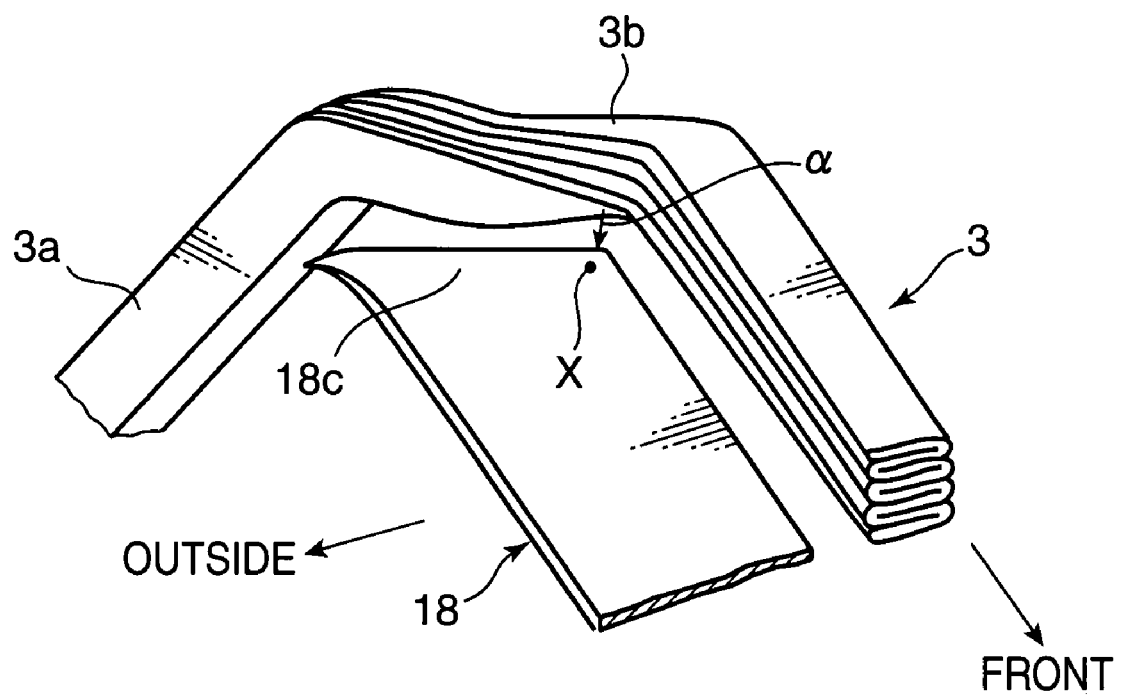
FIG. 9 is a perspective view showing a mounting of a curtain member.

More specifically, the curtain member 3 has a bending section 3b continuously extending from the rear section 3a. The bending section 3b is forward of the rear section 3a, and extends in such an oblique direction that more outer side end of the bending section 3b is at more rear position, in plan view. The bending section 3b of the curtain member 3 is disposed along the part in which the front upper end 17c of the D-pillar trim 17 and the rear end 18c of the roof side trim 18 overlap with each other. Also, the bending section 3b is twisted obliquely outward so that the spreading direction α of the bending section 3b passes, as shown in FIG. 9, an inner side portion X of the rear end 18c of the roof side trim 18.

When the rear section 3a of the curtain member 3 is inflated upon a side collision or the like, the rear end 18c of the roof side trim 18 is pressed obliquely and downward from the inner side end thereof. Then, the hooking of the roof side trim 18 by the rear clip member 19 and the front clip member 20 is released, so that the roof side trim 18 comes off the roof side rail 2, and thereafter, as shown by the virtual lines in FIG. 6, the rear section 3a of the curtain member 3 deforms the front upper end 17c of the D-pillar trim 17 outward from the inner side of the D-pillar trim 17 to thereby spreads out to the vehicle cabin. Also, it may be appreciated to provide an attachment construction of releasing the hooking of the upper front section of the D-pillar trim 17 by the upper clip member 24 in this time.

Figure 10:
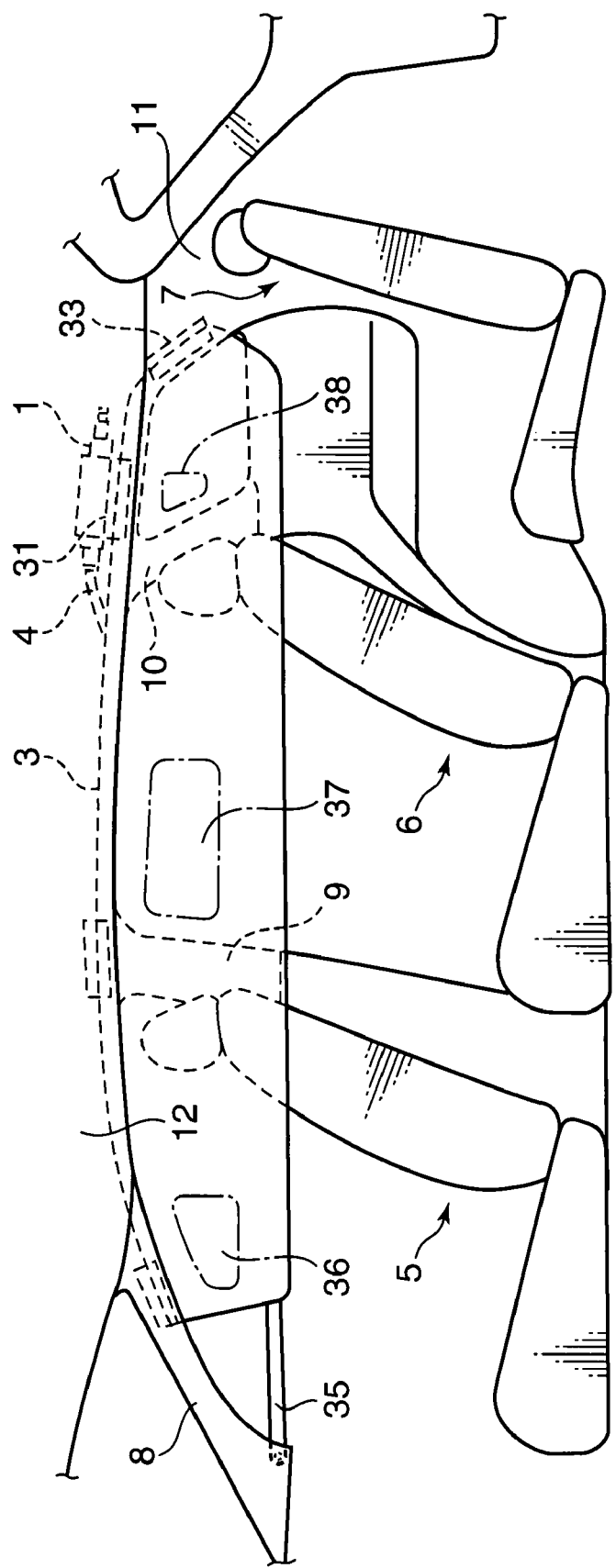
FIG. 10 is a side view of the vehicle, showing a spreading of the curtain member.

Furthermore, as described above, the rear section 3a of the curtain member 3 that is accommodated in the state of extending in the up and down direction along the front surface of the D-pillar 11 is twisted larger than the bending section 3b to thereby make the spreading direction of the rear section 3a, as shown in FIGS. 6 and 7, toward the outside of the vehicle body. The rear section 3a of the curtain member 3 is mounted to the inner panel 11a of the D-pillar 11 by the attachment bracket 33. The rear section 3a of the curtain member 3 inflates toward a flange portion 11b of the D-pillar 11, and then pressingly moves along the flange portion 11b to the side end 17b of the D-pillar trim 17. Sequentially, it goes into the vehicle cabin, and thereby, as shown in FIG. 10, the curtain member 3 covers the inner surface of the side window glass 13 at least from the side end 12a of the roof trim 12 to a predetermined lower position in the front of the D-pillar 11.

Moreover, the front end of the curtain member 3 is provided with a holding member 35 in the form of a belt shape to keep the curtain member 3 spread out. The front end of the holding member 35 is fixedly attached to the A-pillar 8. The spread curtain member 3 has in a position unrelated to the protection of an occupant, specifically, a position apart from the head of an occupant who takes each seat 5 to 7, non-expansion portions 36 to 38 which are defined by uniting or sewing on the two curtain sheets tightly. The other portions of the spread curtain member 3 that are all the parts except the non-expansion portions 36 to 38 and includes the rear section 3a spread out between the D-pillar 11 and the side window glass 13 are expansion portions which are inflated by the gas pressure from the inflator 1.

In the configuration, when it is detected to have a side bump, a rollover or other accident, or such an accident is predicted, the inflator 1 starts to operate and supplies the gas pressure through the gas supply pipe 4 to the expansion portion of the curtain member 3 which is accommodated in the folded state like a bellow along the inner surface of the roof side rail 2 and the front surface of the D-pillar 11, so that the curtain member 3 inflates out into the vehicle cabin from the accommodation position. As shown in FIG. 10, the curtain member 3 spreads out to cover the vehicle's side part over the predetermined area. In the way, the curtain member 3 covers the vehicle's side and held on the lower part of the A-pillar 8 and the lower part of the D-pillar 11. Therefore, the curtain member 3 is given a tension in the front and rear directions between the lower part of the A-pillar 8 and the lower part of the D-pillar 11 to keep the spread state. Besides, as described above, although the non-expansion portions 36 to 38 are provided in middle portions of the curtain member 3 in the up and down direction, the expansion portions are formed over the substantial entire area. The lower part of the curtain member 3 has larger inflation volumes in the vehicle width directions than the upper and middle part. Consequently, the curtain member 3 has the greater tension in the front and rear directions, thus enhancing the protection of an occupant more securely.

The curtain member 3 accommodated between the A-pillar 8 and the D-pillar 11 inflates out downward, as shown by the virtual lines in FIG. 4, and press off the boundary between the roof trim 12 and the roof side trim 18. The roof trim 12 is made of more flexible material than the roof side trim 18, and is thus easier to deform. Therefore, the side end 12a of the roof trim 12 lying over the roof side trim 18 is deformed downward. While being guided by the side end 12a of the roof trim 12, the curtain member 3 spreads out to the vehicle cabin. Besides, the curtain member 3 accommodated along the front surface of the D-pillar 11 initially spreads outward in the vehicle width direction, and spreads down through the boundary between the rear end 18c of the roof side trim 18 and the front upper end 17c of the D-pillar trim 17, and as shown by the virtual lines in FIG. 6, spreads to the vehicle cabin while deforming the front end of the D-pillar trim 17.

As described above, the roof trim 12 is made of a flexible material and provided on a lower surface of a ceiling of the vehicle. The D-pillar trim 17 is made of a synthetic resin harder than the roof trim 12 and disposed to cover the rear pillar or the D-pillar 11 located in the rear of the vehicle. The side window glass 13 including a quarter window glass is disposed ahead of the D-pillar trim 17 and whose upper end is located outer than the roof trim 12 in the vehicle width direction. The curtain member 3 which is fixedly mounted on the vehicle body inflates owing to a gas pressure supplied when a predetermined condition is satisfied, and spreads out to cover at least the inner surface of the side window glass 13 from the side end 12a of the roof trim 12 to a predetermined lower position in front of the D-pillar 11. Hence, the front end lower part of the curtain member 3 is hooked on the front pillar or the A-pillar 8 by the holding member 35 or the like. The rear end lower part of the curtain member 3 is hooked on the D-pillar 11 by the attachment bracket 33 or the like. Accordingly, the curtain member 3 can be stably held in the spread out state. This offers an advantage in that when the vehicle bumps sideways, rolls over or meets other accident, the curtain member 3 contributes to effectively restraining an occupant or a part of the occupant's body such as the head from being moved sideward.

The roof side trim 18 is provided between the vicinity of the upper end of the side window glass 13 and the roof trim 12, and the rear end 18c of the roof side trim 18 is disposed to overlap with the front upper end 17c of the D-pillar trim 17 with the rear end 18c positioning below or inner than the front upper end 17c. The curtain member 3 spreads through the boundary between the rear end 18c of the roof side trim 18 and the front upper end 17c of the D-pillar trim 17 to the cabin space of the vehicle. The spreading pressure of the curtain member 3 displaces the inner side of the rear end 18c of the roof side trim 18 toward the vehicle cabin, or detaching the roof side trim 18 from the roof side rail 2 to thereby release the support of the D-pillar trim 17 by the roof side trim 18. Consequently, the rear section 3a of the curtain member 3 can be spread out to the vehicle cabin without causing a large deformation of the front upper end 17c and an excessive stress onto the front upper end 17c.

Accordingly, even if chill air outside of the vehicle makes its way into the vehicle through the outer panel, the side window glass 13 or the like, and the chill air cools the D-pillar trim 17, for example, the cold air of approximately minus 30 degrees, causing the D-pillar trim 17 to easily break, the spreading curtain member 3 will be effectively prevented from breaking off the roof side trim 18 or the front upper end 17c of the D-pillar trim 17 to fragmented pieces. As described above, the rear end 18c of the roof side trim 18 is disposed to overlap with the front upper end 17c of the D-pillar trim 17 with the rear end 18c positioning under the front upper end 17c. Therefore, in the ordinary time, the upper front section of the D-pillar trim 17 can be stably held on the D-pillar 11 without any means for fixing the upper front section of the D-pillar trim 17 to the D-pillar 11. In the accidental time, the curtain member 3 can be properly spread out. Moreover, this construction can eliminate the problem that in the case of the rear end 18c of the roof side trim 18 and the front upper end 17c of the D-pillar trim 17 are connected edge face to edge face, a production error or a thermal expansion and contraction or the like causes a surface irregularity, gap or space or the like in the part where both ends face each other, and keeps their appearance fine.

Furthermore, in the foregoing embodiment, the spreading direction α of the curtain member 3 is set so that the inner side portion X of the rear end 18c of the roof side trim 18 meets the spreading line of the curtain member 3. In this case, the stress is concentrated on the inner side portion X, and the rear end 18c of the roof side trim 18 can be easily displaced to the vehicle cabin owing to the spreading pressure of the curtain member 3. This offers an advantageous effect in that the front upper end 17c of the D-pillar trim 17 can be more effectively prevented from being fragmented and scattered.

In the foregoing embodiment, the bending section 3b of the curtain member 3 is twisted so that the spreading direction α of the curtain member 3 turns to, as shown in FIG. 9, an oblique and outward direction to thereby passéthe inner side portion X of the rear end 18c of the roof side trim 18. Alternatively, however, it may be appreciated to provide a guide member for regulating the curtain member 3 to spread in the spreading direction α.

Moreover, in the foregoing embodiment, the bending section 3b of the curtain member 3 is disposed along the part in which the rear end 18c of the roof side trim 18 and the front upper end 17c of the D-pillar trim 17 overlap with each other. Therefore, when the curtain member 3 is inflated, its spreading pressure can be effectively concentrated on the rear end 18c of the roof side trim 18. Consequently, as the curtain member 3 inflates, the rear end 18c of the roof side trim 18 is largely deformed or the roof side rail 2 is readily detached owing to the spreading pressure of the curtain member 3. The curtain member 3 can be smoothly spread out to the vehicle cabin from the boundary between the rear end 18c of the roof side trim 18 and the front upper end 17c of the D-pillar trim 17.

In addition, in the foregoing embodiment, the front upper end 17c of the rear pillar trim 17 extends obliquely in a rear and outer direction, in plan view. This configuration can suppress forward and outward protrusion of the front upper end 17c which receives the greatest stress when the curtain member 3 is inflated, and effectively prevent the front upper end 17c from breaking off. Besides, this configuration can prevent the curtain member 3 from being bent excessively in the process of bending the curtain member 3 from the disposition along the inner end 18a of the roof side trim 18 to the disposition along the part in which the rear end 18c of the roof side trim 18 and the front upper end 17c of the rear pillar trim 17 overlap with each other, and effectively eliminate the problem that the curtain member 3 cannot be spread out smoothly.

Furthermore, in the foregoing embodiment, as shown in FIG. 4, the inner side end 18a of the roof side trim 18 overlaps with the side end 12a of the roof trim 12 with the inner side end 18a positioning under the side end 12a. Therefore, at the ordinary time, the side end 12a of the roof trim 12 made of the flexible material is supported by the roof side trim 18. This makes it possible to effectively prevent the side end 12a of the roof trim 12 from being deformed. Upon having a side bump or the like, the curtain member 3 spreads out to the cabin space of the vehicle from the part where the roof trim 12 made of the flexible material and the roof side trim 18 made of the hard material overlap with each other. Therefore, the side end 12a of the roof trim 12 is easily deformed, so that the curtain member 3 accommodated along the side end 12a of the roof trim 12 can be smoothly spread out to the cabin space of the vehicle. Besides, the curtain member 3 accommodated along the inner side end 18a of the roof side trim 18 and the bending section 3b of the curtain member 3 accommodated along the front upper end 17c of the D-pillar trim 17 can be continuously spread out to the cabin space of the vehicle, thus facilitating smooth spreading of the curtain member 3.

Moreover, in the foregoing embodiment, the middle pillar 10 is disposed ahead of the rear pillar 11, and the middle pillar trim 16 is disposed so as to cover the middle pillar 10. The front end 18b of the roof side trim 18 overlaps with the rear upper end 16b of the middle pillar trim 16. In this configuration, the spreading pressure of the curtain member 3 deforms the roof side trim 18 largely, or detaches the roof side trim 18 from the roof side rail 2. Therefore, the rear upper end 16b of the middle pillar trim 16 can be restrained from being deformed too large, and the curtain member 3 can be more smoothly spread out to the vehicle cabin.

Furthermore, at the ordinary time, the rear upper end 16b of the middle pillar trim 16 can be supported stably by the roof side trim 18. Also, this configuration can eliminate the problem that in the case of the front end 18b of the roof side trim 18 and the rear upper end 16b of the middle pillar trim 16 are connected edge face to edge face, a production error or a thermal expansion and contraction or the like causes a surface irregularity, gap or space or the like in the part where both ends face each other, and keeps their appearance fine.

Moreover, in the foregoing embodiment, the front upper end 17c of the D-pillar trim 17 has substantially a parallelogram in side view and is inclined forward. The rear section of the D-pillar trim 17 is positioned and fixedly held by means of the positioning clip member 25. In other words, the front upper end 17c is in the state of being supported only on one side. However, the configuration that the rear end 18c of the roof side trim 18 is disposed to overlap with the front upper end 17c of the D-pillar trim 17 with the rear end 18c positioning below or inner than the front upper end 17c can effectively prevent a gap from occurring between the roof side trim 18 and the D-pillar trim 17.

Furthermore, in the foregoing embodiment, the expansion portion which inflates between the rear pillar 11 and the side window glass 13 when the curtain member 3 spreads out is provided in the rear section 3a of the curtain member 3. The rear section 3a of the curtain member 3 can effectively protect the occupants who take the rear row seats 7. Besides, the inflating of the rear section 3a of the curtain member 3 can effectively increase the tension when the curtain member 3 spreads out. This is advantageous in that when the vehicle bumps sideways, rolls over or meets other accident, the curtain member 3 contributes to more effectively restraining an occupant or a part of the occupant's body from being moved sideward.

As described above, when the curtain member 3 inflates and spreads out from the boundary between the front upper end 17c of the rear pillar trim 17 and the rear end 18c of the roof side trim 18, the curtain member 3 neat the roof side trim 18 is oriented downward and is spread near the front end of the rear pillar trim 17. Accordingly, the trim portions at the boundary part are likely to be subjected to a great spreading pressure. However, the above-mentioned configurations can prevent the rear pillar trim 17 or the roof side trim 18 from being damaged.

Moreover, in the foregoing embodiment, the adhesive tapes 22, 23 are glued onto the portions around the front upper end 17c of the rear pillar trim 17. Accordingly, even if the vehicle has a side bump or the like and the rear section 3a of the curtain member 3 inflates between the rear pillar 11 and the side window glass 13 to cause the likelihood that the front upper end 17c of the rear pillar trim 17 is fragmented, the scatter restraint members of the adhesive tapes 22, 23 can effectively restrain the fragmented section from flying into pieces.

Moreover, in the foregoing embodiment, the vicinity of the rear end of the roof side trim 18 is detachably attached to the inner panel 2a of the roof side rail 2 using the clip member 19. Accordingly, when the vehicle has a side bump or the like, the curtain member 3 spreads out through the boundary between the rear end 18c of the roof side trim 18 and the front upper end 17c of the rear pillar trim 17 to the cabin space of the vehicle, and the pressing force releases the attachment of the roof side trim 18 by the rear clip member 19 to causes the rear end of the roof side trim 18 to come off from the side member of the vehicle body. This makes it possible to spread the curtain member 3 easily.

In the foregoing embodiment, the rear clip member 19 made of metal detachably attaches the vicinity of the rear end of the roof side trim 18 to the side section of the vehicle body. This configuration can eliminate the problem of a rear clip member made of a synthetic resin that the cold surrounding decreases the elasticity of the resin-made clip member, and hinders the smooth detachment of the roof side trim 18 when the curtain member 3 spreads out, and reliably assure the smooth detachment of the rear end of the roof side trim 18 from the side section of the vehicle body even when the cold surrounding decreases the temperature of the rear clip member 19, for example, to approximately minus 30 degrees, and the curtain member 3 spreads out from the boundary between the rear end 18c of the roof side trim 18 and the front upper end 17c of the rear pillar trim 17 to the cabin space of the vehicle upon having a side bump or the like.

Furthermore, in the foregoing embodiment, the vicinity of the rear end of the roof side trim 18 is positioned by the rear clip member 19, and detachably held onto the inner panel 2a of the roof side rail 2. According to the configuration, the overlap of the rear end 18c of the roof side trim 18 with the front upper end 17c of the rear pillar trim 17 can be properly regulated even if having a production error or the like. Therefore, at an ordinary time, the front upper end 17c of the rear pillar trim 17 can be properly supported by the rear end 18c of the roof side trim 18. Besides, when the vehicle has a side bump or the like, the holding of the roof side trim 18 by the rear clip member 19 is released to thereby allow the curtain member 3 to certainly spread through the boundary between the rear end 18c of the roof side trim 18 and the front upper end 17c of the rear pillar trim 17 to the cabin space of the vehicle.

Instead of the configuration that the vicinity of the rear end 18c of the roof side trim 18 is detachably held onto the inner panel 2a of the roof side rail 2 by the rear clip member 19, however, the vicinity of the rear end 18c of the roof side trim 18 may be detachably held onto a side member of the vehicle body, e.g., a hard trim having a predetermined strength.

Moreover, in the foregoing embodiment, the upper rear section of the rear pillar trim 17 is positioned and fixedly held on the vehicle body by means of the positioning clip member 25, and the upper front section of the rear pillar trim 17 is supported on the vehicle body in the state of being allowed to displace in accordance with a thermal expansion by means of the upper clip member 24. According to the configuration, when the vehicle has a side bump or the like, the upper rear section of the rear pillar trim 17 remains positioned, and the spreading pressure of the curtain member 3 releases the holding of the upper rear section of the rear pillar trim 17 by the upper clip member 24 to thereby enable the front upper end 17c to be smoothly deformed, thus spreading the rear section 3a of the curtain member 3 to the vehicle cabin smoothly.

The foregoing embodiment refers to the vehicle including the three rows of seats 5 to 7 for occupants in the front and rear directions. However, the present invention may also be applied to a vehicle including two rows of seats for occupants in the front and rear directions. In this case, a C pillar which is provided in a rearmost position of the vehicle is a rear pillar, and a roof side trim 18 is provided to cover a lower surface of a roof side rail 2 between the C pillar and a middle pillar or B-pillar ahead of it. Besides, even in the case that a side window glass 13 having an inverted triangle shape in side view is provided, the present invention can also be applied.

As described above, a rear structure of a vehicle which includes a roof trim which is made of a flexible material and disposed on a lower surface of a ceiling part of the vehicle, a rear pillar trim which is made of a synthetic resin harder than the roof trim and disposed so as to cover a rear pillar located in the rear of the vehicle, and a side window glass which is disposed ahead of the rear pillar trim and whose upper end is located outer than the roof trim in a width direction of the vehicle, the rear structure comprising an air bag device including a curtain member which is fixedly attached to a vehicle body and operable to inflate with a gas pressure supplied upon a predetermined condition to thereby spread over at least an inner surface of the side window glass from a side end of the roof trim and a front surface of the rear pillar. Further, a roof side trim is provided between a vicinity of an upper end of the side window glass and the roof trim, and a rear end of the roof side trim overlaps with a front upper end of the rear pillar trim with the rear end positioning inner than the front upper end so that the curtain member spreads from an inner end of the roof side trim and a boundary between the rear end of the roof side trim toward a cabin space of the vehicle.

Preferably, a spreading direction of the curtain member may be made to pass an inner portion of the rear end of the roof side trim.

The curtain member may be preferably disposed along the overlapping zone of the rear end of the roof side trim and the front upper end of the rear pillar trim.

It may be preferable that the front upper end of the rear pillar trim extends, in plan view, obliquely in a rear and outer direction.

Also, it may be preferable that an inner side end of the roof side trim overlaps with a side end of the roof trim with the inner side end positioning inner than the side end of the roof trim so that the curtain member spreads from the overlapping zone of the inner side end of the roof side trim and the side end of the roof trim toward a cabin space of the vehicle.

The vehicle may be further provided with a middle pillar disposed ahead of the rear pillar, and a middle pillar trim covering the middle pillar, and a front end of the roof side trim overlaps with a rear upper end of the middle pillar trim with the front end positioning inner than the rear upper end.

The curtain member may be preferably provided with an expansion portion which expands between the rear pillar and the side window glass when the curtain member spreads.

The roof side trim may be preferably provided with a clip member at a vicinity of a rear end of the roof side trim for detachably attaching the roof side trim to the vehicle body.

The clip member may be preferably made of a metal material.

The rear pillar trim may be preferably mounted to the vehicle in a state that an upper rear section of the rear pillar trim is positionally limited for a thermal expansion while an upper front section of the rear pillar trim is positionally unlimited for a thermal expansion.

This application is based on patent application Nos. 2006-90845 and 2006-90846 filed in Japan, the contents of which are hereby incorporated by references.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A rear structure of a vehicle including a roof trim which is made of a flexible material and disposed on a lower surface of a ceiling part of the vehicle, a rear pillar trim which is made of a synthetic resin harder than the roof trim and disposed so as to cover a rear pillar located in the rear of the vehicle, and a side window glass which is disposed ahead of the rear pillar trim and whose upper end is located outer than the roof trim in a width direction of the vehicle, the rear structure comprising an air bag device including a curtain member which is fixedly attached to a vehicle body and operable to inflate with a gas pressure supplied upon a predetermined condition to thereby spread over at least an inner surface of the side window glass from a side end of the roof trim and a front surface of the rear pillar, wherein a roof side trim is provided between a vicinity of an upper end of the side window glass and the roof trim, and a rear end of the roof side trim overlaps with a front upper end of the rear pillar trim with the rear end positioning inner than the front upper end so that the curtain member spreads from an inner end of the roof side trim and a boundary between the rear end of the roof side trim toward a cabin space of the vehicle.

2. The rear structure of the vehicle according to claim 1, wherein a spreading direction of the curtain member passes an inner portion of the rear end of the roof side trim.

3. The rear structure of the vehicle according to claim 2, wherein the curtain member is disposed along the overlapping zone of the rear end of the roof side trim and the front upper end of the rear pillar trim.

4. The rear structure of the vehicle according to claim 3, wherein the front upper end of the rear pillar trim extends, in plan view, obliquely in a rear and outer direction.

5. The rear structure of the vehicle according to claim 4, wherein an inner side end of the roof side trim overlaps with a side end of the roof trim with the inner side end positioning inner than the side end of the roof trim so that the curtain member spreads from the overlapping zone of the inner side end of the roof side trim and the side end of the roof trim toward a cabin space of the vehicle.

6. The rear structure of the vehicle according to claim 5, wherein the vehicle further comprises a middle pillar disposed ahead of the rear pillar, and a middle pillar trim covering the middle pillar, and a front end of the roof side trim overlaps with a rear upper end of the middle pillar trim with the front end positioning inner than the rear upper end.

7. The rear structure of the vehicle according to claim 6, wherein the curtain member includes an expansion portion which expands between the rear pillar and the side window glass when the curtain member spreads.

8. The rear structure of the vehicle according to claim 7, wherein the roof side trim is provided with a clip member at a vicinity of a rear end of the roof side trim for detachably attaching the roof side trim to the vehicle body.

9. The rear structure of the vehicle according to claim 8, wherein the clip member is made of a metal material.

10. The rear structure of the vehicle according to claim 9, wherein the rear pillar trim is mounted to the vehicle in a state that an upper rear section of the rear pillar trim is positionally limited for a thermal expansion while an upper front section of the rear pillar trim is positionally unlimited for a thermal expansion.

11. The rear structure of the vehicle according to claim 1, wherein the curtain member is disposed along the overlapping zone of the rear end of the roof side trim and the front upper end of the rear pillar trim.

12. The rear structure of the vehicle according to claim 1, wherein the front upper end of the rear pillar trim extends, in plan view, obliquely in a rear and outer direction.

13. The rear structure of the vehicle according to claim 1, wherein an inner side end of the roof side trim overlaps with a side end of the roof trim with the inner side end positioning inner than the side end of the roof trim so that the curtain member spreads from the overlapping zone of the inner side end of the roof side trim and the side end of the roof trim toward a cabin space of the vehicle.

14. The rear structure of the vehicle according to claim 1, wherein the vehicle further comprises a middle pillar disposed ahead of the rear pillar, and a middle pillar trim covering the middle pillar, and a front end of the roof side trim overlaps with a rear upper end of the middle pillar trim with the front end positioning inner than the rear upper end.

15. The rear structure of the vehicle according to claim 1, wherein the curtain member includes an expansion portion which expands between the rear pillar and the side window glass when the curtain member spreads.

16. The rear structure of the vehicle according to claim 1, wherein the roof side trim is provided with a clip member at a vicinity of a rear end of the roof side trim for detachably attaching the roof side trim to the vehicle body.

17. The rear structure of the vehicle according to claim 1, wherein the rear pillar trim is mounted to the vehicle in a state that an upper rear section of the rear pillar trim is positionally limited for a thermal expansion while an upper front section of the rear pillar trim is positionally unlimited for a thermal expansion.

* * * * *